(12) United States Patent
Thornton et al.

(10) Patent No.: US 7,780,792 B2
(45) Date of Patent: Aug. 24, 2010

(54) PROCESS FOR GELATINISING STARCH USING A BIODEGRADABLE POLYMER MATERIAL BEARING ALDEHYDE GROUPS

(75) Inventors: Jeffrey Wilson Thornton, Huizen (NL); Theodoor Maximili Slaghek, Rotterdam (NL); Johannes Wilhelm Timmermans, Ede (NL); Jan Matthijs Jetten, Zeist (NL); Harm Jan Thiewes, Woudenberg (NL)

(73) Assignee: Nederlandse Organisatie Voor Toegepast-Natuurwetenschappelijk Onderzoek Tno, VK Delft (NL)

( * ) Notice: Subject to any disclaimer, the term of this patent is extended or adjusted under 35 U.S.C. 154(b) by 218 days.

(21) Appl. No.: 10/594,121

(22) PCT Filed: Mar. 24, 2005

(86) PCT No.: PCT/NL2005/000222
§ 371 (c)(1),
(2), (4) Date: Nov. 28, 2006

(87) PCT Pub. No.: WO2005/090462
PCT Pub. Date: Sep. 29, 2005

(65) Prior Publication Data
US 2008/0234431 A1 Sep. 25, 2008

(30) Foreign Application Priority Data
Mar. 24, 2004 (EP) .................................. 04075924

(51) Int. Cl.
C08B 30/00 (2006.01)
(52) U.S. Cl. .......................................... 127/71; 127/67
(58) Field of Classification Search .................. 524/47; 127/67, 71
See application file for complete search history.

(56) References Cited

U.S. PATENT DOCUMENTS

| | | | | |
|---|---|---|---|---|
| 3,632,802 A * | 1/1972 | BeMiller et al. | ............. | 536/105 |
| 4,788,280 A * | 11/1988 | Billmers et al. | ............. | 536/104 |
| 4,992,100 A * | 2/1991 | Koepff et al. | ............. | 106/160.1 |
| 5,147,907 A * | 9/1992 | Rinck et al. | ............. | 524/48 |
| 5,428,150 A * | 6/1995 | De Bock et al. | ............. | 536/102 |
| 5,747,658 A * | 5/1998 | Veelaert et al. | ............. | 536/18.5 |
| 5,773,495 A * | 6/1998 | Haschke et al. | ............. | 524/52 |
| 6,265,570 B1 | 7/2001 | Cimecioglu et al. | | |
| 6,313,105 B1 | 11/2001 | Bengs et al. | | |
| 6,406,530 B1 * | 6/2002 | Bengs et al. | ............. | 106/137.1 |
| 6,506,824 B1 * | 1/2003 | Bastioli et al. | ............. | 524/47 |
| 6,518,419 B1 * | 2/2003 | Van Der Lugt et al. | ...... | 536/105 |
| 6,565,640 B1 * | 5/2003 | Bengs et al. | ............. | 106/209.1 |
| 6,716,976 B1 * | 4/2004 | Jetten et al. | ............. | 536/124 |
| 6,730,724 B1 * | 5/2004 | Bastioli et al. | ............. | 524/47 |
| 6,736,889 B2 * | 5/2004 | Bengs et al. | ............. | 106/215.2 |
| 6,824,645 B2 * | 11/2004 | Jaschinski et al. | ............. | 162/9 |
| 6,831,173 B1 * | 12/2004 | Jetten et al. | ............. | 536/123.1 |
| 7,255,732 B2 * | 8/2007 | Fischer et al. | ............. | 106/208.1 |
| 2001/0039303 A1 * | 11/2001 | Loercks et al. | ............. | 524/47 |
| 2002/0098317 A1 * | 7/2002 | Jaschinski et al. | ............. | 428/72 |
| 2003/0027901 A1 * | 2/2003 | Richardson et al. | ............. | 524/47 |
| 2003/0180524 A1 | 9/2003 | Fischer et al. | | |
| 2003/0194471 A1 * | 10/2003 | Bengs et al. | ............. | 426/106 |
| 2005/0106686 A1 * | 5/2005 | Jetten et al. | ............. | 435/101 |
| 2005/0171249 A1 * | 8/2005 | Wang et al. | ............. | 524/47 |
| 2005/0256306 A1 * | 11/2005 | Woo et al. | ............. | 536/105 |
| 2006/0276569 A1 * | 12/2006 | Richardson et al. | ............. | 524/47 |
| 2007/0006875 A1 * | 1/2007 | Fischer et al. | ............. | 127/32 |
| 2007/0270608 A1 * | 11/2007 | Boersma et al. | ............. | 562/400 |
| 2008/0105393 A1 * | 5/2008 | Besemer et al. | ............. | 162/70 |

FOREIGN PATENT DOCUMENTS

| | | |
|---|---|---|
| EP | 0 999 222 A | 5/2000 |
| EP | 1 134 258 A1 | 9/2001 |
| WO | 99/02599 A | 1/1999 |
| WO | 00/26257 A | 5/2000 |
| WO | WO0050621 A2 * | 8/2000 |
| WO | WO 01/68762 | 9/2001 |
| WO | 2004/029147 A | 4/2004 |

OTHER PUBLICATIONS

International Search Report of PCT/NL2005/000222, mailed Jun. 15, 2005.

* cited by examiner

*Primary Examiner*—Mark Eashoo
*Assistant Examiner*—Liam J Heincer
(74) *Attorney, Agent, or Firm*—Nixon & Vanderhye P.C.

(57) ABSTRACT

The invention provides a process wherein starch and/or a starch derivative can be gelatinized more efficiently by means a thermo mechanical treatment, when a carbohydrate polymer is used comprising aldehyde containing monomer units which comprise one or more aldehyde groups that are derived from one or more a primary alcohol groups. With this process a granulate or other semi-finished product can be obtained that can be shaped to produce an article that has excellent dimensional stability in water. The invention further provides a granulate, a shaped starch product, a food product or a blown starch film comprising such a carbohydrate polymer.

9 Claims, No Drawings

PROCESS FOR GELATINISING STARCH USING A BIODEGRADABLE POLYMER MATERIAL BEARING ALDEHYDE GROUPS

This application is the US national phase of international application PCT/NL2005/000222, filed 24 Mar. 2005, which designated the U.S. and claims priority of EP 04075924.3, filed 24 Mar. 2004, the entire contents of each of which are hereby incorporated by reference.

The invention relates to a starch formulation that promotes gelatinisation of starch by means of a thermo mechanical treatment.

Thermoplastic starch has proved suitable as a material for the production of biodegradable moulded products, such as packaging material. Apart from biodegradability, starch has the advantage that it is available from an inexhaustible source, in contrast to more common materials, such as those based on fossil hydrocarbons.

Starch has to be rendered thermoplastic for processing to moulded products for this purpose the crystal structure of starch must be disrupted by gelatinisation. A thermal treatment in the presence of water is usually needed for gelatinisation. Gelatinisation is often combined with a thermo mechanical treatment. Extrusion is a suitable process for this. A plasticiser is needed in the thermoplastic processing of starch. Water itself acts as a plasticiser, but usually supplementary plasticisers, such as glycerol or urea, are used for efficient process control.

A disadvantage of the known extrusion methods is that relatively high temperatures, above 120° C., and large amounts of plasticiser (for instance 25% (m/m), based on the dry starch) are needed for the continuous thermo mechanical treatment of the starch, which has the result that the mechanical properties decrease with increasing plasticiser concentration.

Moreover, the processing of starch is more difficult, and in particular slower, than the processing of the polyolefins usually used, such as PE. The production rate of an extruder is 2.5 times lower with starch than with PE.

Another disadvantage of these thermoplastic starch products is their high sensitivity to water. Consequently, they cannot be used as packaging material for many applications.

In WO 99/02599 it is proposed to add 5-30% dialdehyde starch (DAS) to starch in order to improve the water resistance of the end product formed. The dialdehyde starch applied has a high degree of oxidation (70-95%), which means that all of the modified monomer units of the starch comprise at least two aldehyde groups per unit.

Surprisingly, it has now been found that the addition of a carbohydrate polymer or a synthetic polymer with one or more aldehyde groups per hundred monomer unit, which one or more aldehyde groups are derived from one or more primary alcohol groups, has a beneficial effect on the continuous processing of the starch. Even small amounts of such carbohydrate polymers or synthetic polymers comprising one or more of such aldehyde groups allow for a considerable lowering of the extrusion temperature and the capacity of the extruder is considerably increased. In this context, it has surprisingly been found that the use of a small number of aldehyde groups in the carbohydrate polymer when compared with, for instance the corresponding degree of oxidation of dialdehyde starch (DAS) brings about complete gelatinisation in a more efficient manner and at a lower temperature. Additionally, it has been found that the addition of a carbohydrate polymer containing such a relatively small number of aldehyde groups to produce thermoplastic starch, allows the end product to be dimensionally stable in water.

Further, the carbohydrate polymer to be used in accordance with the present invention is much cheaper when compared to materials such as dialdehyde starch and monoaldehyde carboxy starch (MACS). Moreover, the application of a smaller number of aldehyde groups in the carbohydrate polymer as such and per aldehyde containing monomer unit, when compared to WO 99/02599, is also found to be associated with a better tensile strength (higher modulus). Consequently, a cross-linking agent (glyoxal and the like), such as is used according to WO 99/02599, is not needed in this case, which allows the process to be carried out much more efficiently and cost-effectively.

Accordingly, the present invention relates to a process for gelatinising starch and/or a starch derivative by subjecting starch and/or a starch derivative in the presence of a carbohydrate polymer or synthetic polymer to a thermo mechanical treatment, which carbohydrate polymer or synthetic polymer comprises aldehyde containing monomer units, whereby at least 1% of the aldehyde containing monomer units comprise one or more aldehyde groups per monomer unit which one or more aldehyde groups are derived from one or more primary alcohol groups.

Preferably, the one or more aldehyde groups are derived from one or more primary alcohol groups at the C-6 position.

The carbohydrate polymer to be used in accordance with the present invention can be further modified so as to comprise 2-3 aldehyde groups per monomer unit. Further, the carbohydrate polymer to be used can be blended with DAS or MACS, or synthetic polymers.

Preferably, use is made of carbohydrate polymer in the process according to the present invention.

Preferably, the thermo mechanical treatment is carried out continuously. Suitably, such a continuous thermo mechanical treatment is carried out by means of an extrusion process.

Preferably, 1-95% of the monomer units of the carbohydrate polymer or synthetic polymer to be used in accordance with the present invention comprise one or more aldehyde groups that are derived from one or more primary alcohol groups. More preferably, 1-50% of the monomer units of the carbohydrate polymer or synthetic polymer to be used in accordance with the present invention comprise one or more aldehyde groups that are derived from one or more primary alcohol groups. Most preferably, 1-20% of the monomer units of the carbohydrate polymer or synthetic polymer to be used in accordance with the present invention comprise one or more aldehyde groups that are derived from one or more primary alcohol groups.

In practice this means that the aldehyde containing monomer units of the carbohydrate polymer to be used in accordance with the present invention comprise one aldehyde group per monomer unit. Based on total number of monomer units (including non-modified units) the carbohydrate polymer to be used comprises on average suitably 1-299, more suitably 1-200, preferably 1-100, more preferably 1-50, and most preferably 1-30 aldehyde groups per hundred monomer units.

The carbohydrate polymer to be used in the present invention can be derived from any carbohydrate polymer comprising a primary alcohol group. Such carbohydrate polymers include non-reducing disaccharides and oligosaccharides, such as sucrose, raffinose, trehalose and similar oligosaccharides, and polysaccharides, which are 1,2-, 1,4- or 1,6-linked. Examples include α-1,4-glucans (the "starch family"), β-1,4-glucans (cellulose), glucomannans and galactomannans (guar and locust bean gum), (arabino) xylans (hemicellulose)

and β-2,1 and β-2,6-fructans (inulin and levan). The starch-type carbohydrates, cellulose and fructans are preferred carbohydrate polymers.

Modifications of starch and other carbohydrate polymers can also be used as starting materials, and comprise partially hydrolysed products, as well as physical and chemical modifications, including hydroxyalkyl, carboxyalkyl and similar derivatives, as well as uronic acid analogues.

The carbohydrate polymers to be used in the invention can be obtained by subjecting a carbohydrate polymer starting material as defined here above to an oxidation treatment. In this way in monomer units of the carbohydrate polymer, the primary alcohol groups that are present can be converted into one or more aldehyde groups per unit, whereas in other (the remaining) monomer units the 1,2-dihydroxyethylene groups (e.g. in starch C2 and C3-hydroxy groups) can be converted into two aldehyde groups per unit, or the C2, C3 and C6-hydroxy groups can all three be converted into aldehyde groups.

This can suitably be established by subjecting the carbohydrate polymer to an oxidation treatment. Such oxidation treatments are as such known to the skilled person.

It will be understood that during the oxidation of primary alcohol groups, part of the aldehydes groups may be converted into carboxylate groups.

Alternatively, the aldehyde groups could be introduced into the monomer units by way of substitution. This can for instance be established by subjecting the carbohydrate polymer to a substitution treatment wherein use is made of protected aldehydes (acetals) or substituted unsaturated functionalities followed by oxidation of e.g. through hindered nitroxyl mediated oxidation. In this way modified monomer units can be obtained which comprise one aldehyde group per modified monomer unit, whereas other (the remaining) monomer units can be obtained which comprise two or more aldehyde groups per unit. Such substitution treatments include periodate oxidation in combination with the earlier mentioned methods.

Suitable carbohydrate polymers include polysaccharide esters described in U.S. Pat. Nos. 4,749,800; 6,265,570 B1; and 4,801,699, which documents are herein incorporated by reference.

Surprisingly, it has now been found that carbohydrate polymers can very attractively be used in the present invention when their vicinal diol systems have not been cleaved. The carbohydrate polymers which comprise such non-cleaved vicinal diol systems are easier dissolved, stored under dry conditions, more stable under basic and oxidative conditions and display an improved processability when compared with carbohydrate polymers of which vicinal diol systems have been cleaved.

It will be understood that the carbohydrate polymer can be further modified so as to comprise 2-3 aldehyde groups per monomer unit. In that case the carbohydrate polymer will in addition comprise a vicinal diol system that may be cleaved.

Suitable carbohydrate polymers comprising non-cleaved vicinal diol systems include starch, cellulose, fructans and hemi-cellulose and galactomannans.

In the process according to the present invention the carbohydrate polymer preferably comprises starch and cellulose.

In addition to these natural carbohydrate polymers also synthetic polymers can suitably be used in accordance with the present invention. Preferably, use is made of carbohydrate polymers.

In addition to the aldehyde groups, the carbohydrate polymer may also contain other functional groups, such as hydroxyalkyl groups, cationic groups, carboxyl groups and other acid groups.

A considerable improvement in gelatinisation is already obtained when the carbohydrate polymer or synthetic polymer to be used according to the present invention is present in an amount of from 1 to 100 wt %, based on the total weight of the starch and/or starch derivate and the carbohydrate polymer or synthetic polymer. Preferably, the carbohydrate polymer or synthetic polymer is present in an amount in the range of from 10 to 100 wt %, and more preferably in the range of from 25 to 100 wt %, based on the total weight of the starch and/or starch derivate and the carbohydrate polymer or synthetic polymer. Furthermore, it has been found that addition of small amounts of the carbohydrate polymer already improve the viscosity of the melt considerably, bringing about an improved processing of the starch The carbohydrate polymer or synthetic polymer to be used in accordance with the present invention can have a wide range of average molecular weights. Suitable examples include those polymers having an average molecular weight of at least 500, but also granular types of starch.

The starch that is gelatinised according to the present process can be any type of starch, for example originating from potatoes, maize, cassava, etc. It can also be starch with a high amylose content or, specifically, a high amylopectin content, optionally produced by recombinant organisms. Also two or more types e.g. as a mixture of starch can be used. The starch can be mixed with any other naturally occurring polymer (biopolymer) that can be thermoplastically processed separately from or together with starch, such as cellulose, chitosan, alginate, other microbial or vegetable gums, pectin, gelatine, polylysine, casein or other proteins. Modified starch and modified forms of the other hereinabove-mentioned naturally occurring polymers can also be present. Preferably, the percentage of starch in the total amount of the biopolymer is at least 30-wt %, in particular at least 80 wt %.

Starch derivatives that can suitably be gelatinised with the process of the present invention include for instance cationic starch, oxidised starch, and acetylated starch. A mixture of two or more starch derivatives can be used in the process of the present invention. Also mixtures of one or more of these starch derivatives and one or more of the above-mentioned types of starch can suitably be used in the present process.

Water is the most effective plasticiser for starch. The amount of water relative to starch is 5-80%, that is to say 5-80 g water per 100 g starch/polymer mixture, preferably 10-70 wt %, and more preferentially 12-60 wt %.

For the long-term stability of the thermoplastic end product yet further plasticisers may need to be added. This is because if water is added to starch as the sole plasticiser, the water is able to diffuse away in the course of time, as a result of which the material becomes brittle. Various other plasticisers for starch are known, such as hydroxy compounds or polyols (such as glycol, di- and polyglycol, glycerol, erythritol, pentaerythritol, sorbitol, other sugar alcohols, gluconic acid, etc.), partial esters thereof, amide compounds (such as urea) and metal carboxylates (such as sodium lactate). The amount of other plasticiser, based on the dry starch or starch/biopolymer mixture, is preferably 8-75 wt %, more preferentially 10-50 wt % and in particular 15-45 wt %. The percentage of plasticisers that is needed for gelatinising starch can already be reduced by adding small amounts of the present carbohydrate polymer.

Clay minerals can also be added to the mixture to be extruded. Such mixture can comprise starch or a starch/ biopolymer mixture with the present carbohydrate polymer and plasticisers, one of which is water. Reference is in this context made to WO 01/68762, which document is herein incorporated by reference. The clay minerals concerned are preferably montmorillonite, saponite, hectorite and other minerals of the smectite type. The amount of clay particles can vary from, for example, 1-50 wt %, and in particular 2-10 wt %, based on the dry weight of the starch (and any other biopolymers). The addition of clay leads to an improvement in the mechanical and gas barrier properties of the end product. In addition to naturally occurring polymers, biodegradable synthetic polyesters can be added to the mixture, for example the polyesters as described in U.S. Pat. No. 6,348,524 in particular polycaprolactone, polylactate, polyhydroxyacetate and polyhydroxybutyrate, polyethylene succinate, polybutylene succinate and the like, as well as copolymers and mixtures thereof. The amount of polyester can, for example, be between 10 and 80% (m/m), based on the amount of dry starch.

The polyester can be blended directly with the extrudate, but, if used, is preferably added in the course of the process, for example at a point halfway through the extrusion.

Depending on the application of the end product, additives such as pigments, stabilisers, processing agents, flavours and fragrances, and also anti-fouling agents or release retarders, can also be added.

The thermo mechanical treatment is preferably carried out in the form of an extrusion process in a twin-screw extruder and at temperatures of 70-170° C. Preferably, the thermo mechanical treatment is carried out at a temperature of less than 140° C., more preferably at a temperature in the range of from 80 to 130° C. The temperatures mentioned here refer to the actual temperatures in the extruder. High shear forces during the extrusion to disrupt the starch crystal structure, such as those, which are customary in present day production of thermoplastic starch, have become superfluous as a result of the use of water as plasticiser and the addition of the present carbohydrate polymer. In this way, the processing of biopolymers to obtain a thermoplastic material gives a more effective disruption of starch granules at a lower temperature and the production rate is increased at the same time. In principle, discontinuous thermo mechanical treatment is also possible, but has the disadvantage of a lower productivity. The advantages of the invention are best revealed in a continuous process. Hence, in the present invention the thermo mechanical treatment is preferably carried out continuously.

With the thermo mechanical treatment semi-finished products in the form of granulates, sheets, films or other forms are produced that can be further processed. These thermoplastic products must usually be stored for at least 3 hours immediately after extrusion to reach a thermodynamically stable equilibrium, and to obtain a completely water-resistant product. Storage can best take place in a closed box or bag, but can also be carried out in an open store if the atmospheric humidity is not less than 50% (RH). These thermoplastic semi-finished products can be further processed in a known thermo mechanical manner to give shaped articles by means of injection moulding, foaming, film casting, deep drawing, film blowing, film pressing and the like.

The invention also relates to the intermediate product that can be obtained by the process described above, in particular a granulate, powder, film, etc, and to the shaped end product that can be obtained from this intermediate product. The granulate of thermoplastic starch as obtained according to the invention can be processed to give hot-pressed films and further processed by means of film blowing. Other shaping steps, such as injection moulding or thermoforming, can also be employed. The end product can, in particular, be a blown film, which in addition to the starch and the present carbohydrate polymer and any other biopolymers and plasticisers can contain 10-80 wt %, in particular 10-40 wt % polyester.

The present invention therefore also relates to a granulate of thermoplastic starch that comprises a thermoplastic starch and a carbohydrate polymer or synthetic polymer, wherein the carbohydrate polymer or synthetic polymer is present in an amount in the range of from 1 to 90 weight %, preferably 2-80 weight %, and more preferably 3-75 weight %, based on total thermoplastic starch, a polyol or urea as plasticer and water, which carbohydrate polymer or synthetic polymer comprises aldehyde containing monomer units, whereby at least 1% of the aldehyde containing monomer units comprise one or more aldehyde groups per monomer unit which one or more aldehyde groups are derived from one or more primary alcohol groups.

The present invention further relates to a shaped starch product that comprises a thermoplastic starch and carbohydrate polymer or a synthetic polymer, wherein the carbohydrate polymer or synthetic polymer is present in an amount in the range of from 1 to 90 weight %, preferably 2-80 weight %, and more preferably 3-75 weight %, based on the total thermoplastic starch, a polyol or urea as plasticer and water, which carbohydrate polymer or synthetic polymer comprises aldehyde containing monomer units, whereby at least 1% of the aldehyde containing monomer units comprise one or more aldehyde groups per monomer unit which one or more aldehyde groups are derived from one or more primary alcohol groups.

Additionally, the present invention also relates to a blown starch film that comprises a thermoplastic starch and a carbohydrate polymer or synthetic polymer, wherein the carbohydrate polymer or synthetic polymer is present in an amount in the range of from 1 to 90 weight %, preferably 2-80 weight %, and more preferably 3-75 weight %, based on total thermoplastic starch, a polyol or urea as plasticer and water, which carbohydrate polymer or synthetic polymer comprises aldehyde containing monomer units, whereby at least 1% of the aldehyde containing monomer units comprise one or more aldehyde groups per monomer unit which aldehyde groups are derived from one or more primary alcohol groups.

The present invention further relates to a food product that comprises a food component and a carbohydrate polymer or synthetic polymer, which carbohydrate polymer or synthetic polymer comprises aldehyde containing monomer units, whereby at least 1% of the aldehyde containing monomer units comprise one or more aldehyde groups per monomer unit which one or more aldehyde groups are derived from one or more primary alcohol groups.

The present invention also relates to a starch or starch product as described here above which in addition comprises a polyester.

EXAMPLES

Example 1

Four premixes were made (see Table 1) using native potato starch (moisture content 14.6%), demineralised water, glycerol and one of the following modified starches:
a) Dialdehyde starch (DAS) (degree of oxidation 20%, moisture content 50.7%),
b) C6-aldehyde starch powder ([a]starch first gelatinised, degree of oxidation 21%, moisture content 9.0%),
c) C6-aldehyde starch granules ([b]degree of oxidation 7.4%, moisture content 25.0%), The composition of the premixes are given as ratio of air-dry starch, air-dry modified starch, water (corrected for water present in starch and modified starch) and glycerol used.

TABLE 1

Composition of premixes

| Premix | Composition Premix | Parts Starch | Parts modified starch | Parts water | Parts glycerol |
|---|---|---|---|---|---|
| 1 | Starch only | 100 | 0 | 45 | 40 |
| 2 | Starch/C6-aldehyde gelatinized | 90 | 10 | 45 | 40 |
| 3 | Starch/C6-aldehyde Particles | 90 | 10 | 45 | 40 |
| 4 | Starch/DAS-20 | 90 | 10 | 45 | 40 |

The premixes were processed on a twin-screw co-rotating DSM midi extruder type 2000, in which the processed material was circulated. Each premix was added at 50° C. at 50 rpm, and subsequently the rotation speed was increased to 245 rpm. Once the extruder reached 245 rpm, the temperature setting was raised to 90° C. and the force on the screws was registered by the instrument as function of time and temperature. In Table 2, the normalized force values are shown as function of time and temperature. The processed materials obtained were analysed with polarized optical microscopy (POM).

TABLE 2

Normalized force as function of time and temperature

| Time (min) | Premix A* T (° C.)#; | Force** | Premix B T (° C.); | Force | Premix C T (° C.); | Force | Premix D T (° C.); | Force |
|---|---|---|---|---|---|---|---|---|
| 0 | 48.2 | 1.00 | 50.0 | 1.00 | 49.7 | 1.00 | 51.6 | 1.00 |
| 1 | 55.8 | 0.77 | 55.9 | 0.84 | 55.2 | 1.13 | 59.0 | 0.93 |
| 2 | 69.5 | 0.68 | 69.1 | 0.77 | 67.0 | 1.09 | 71.0 | 1.07 |
| 3 | 75.5 | 0.63 | 75.5 | 0.78 | 72.8 | 1.04 | 76.1 | 1.02 |
| 4 | 78.1 | 0.61 | 78.4 | 0.85 | 75.7 | 0.98 | 78.5 | 0.95 |
| 5 | 80.7 | 0.58 | 81.5 | 0.97 | 78.9 | 0.90 | 81.0 | 0.90 |
| 6 | 82.9 | 0.57 | 82.9 | 1.10 | 80.9 | 0.86 | 83.0 | 0.86 |
| 7 | 84.4 | 0.55 | 83.5 | 1.03 | 81.9 | 0.81 | 83.9 | 0.82 |
| 8 | 85.3 | 0.55 | 84.2 | 0.90 | 82.3 | 0.78 | 84.3 | 0.79 |
| 9 | 85.8 | 0.54 | 84.3 | 0.84 | 82.3 | 0.76 | 84.3 | 0.77 |
| 10 | 85.9 | 0.54 | 84.3 | 0.80 | 82.2 | 0.74 | 84.1 | 0.76 |
| 11 | 85.8 | 0.54 | 84.1 | 0.78 | 82.3 | 0.72 | 83.6 | 0.75 |
| 12 | 85.5 | 0.54 | 83.8 | 0.77 | 82.5 | 0.70 | 83.2 | 0.75 |
| 13 | 85.1 | 0.54 | 83.5 | 0.76 | 82.4 | 0.69 | 83.0 | 0.75 |
| 14 | 84.7 | 0.55 | 83.6 | 0.76 | 82.3 | 0.68 | 83.1 | 0.74 |
| 15 | — | — | 83.7 | 0.75 | 82.3 | 0.68 | 83.1 | 0.74 |

*Premix A = starch only
Premix B = starch/DAS-20 (40 aldehyde groups per 100 glucose units)
Premix C = starch/C6-aldehyde gelatinised (21 aldehyde groups per 100 glucose units)
Premix D = starch/C6-aldehyde granules (8 aldehyde groups per 100 glucose units)
**Force = normalized force values
Product temperature Table 2 clearly shows that when DAS or C6-aldehyde starch was added to the premix, a force-hurdle on the screws was registered (probably due to crosslinking capability of the aldehyde groups present in the polymer) that resulted in a completely gelatinised extrudate (observed with POM). When C6-aldehyde starch was added, this increase in force was achieved at a lower product temperature (processing temperature) than when DAS was used, which shows a higher reaction efficiency of the C6-aldehyde starch having less aldehyde groups present per 100 glucose units than with DAS-20. In case of the premix only contains starch, only a decrease in force was registered, resulting in an extrudate which still contained starch granules (observed with POM).

[a)] Preparation of C6-Aldehyde Starch Powder

In a 3000 ml glass beaker, 61.5 gram of starch on dry weight basis was gelatinised in 1500 ml of hot demineralised water (solid content: 41 grams/L), and subsequently, the gelatinised starch was cooled with ice to ca. 4° C. Subsequently, 500 mg of sodium bromide, and 250 mg of TEMPO were added before the reaction was started. Subsequently, reaction was started by adding stepwise 91 ml of 2.1 M sodium hypochlorite solution stepwise, and pH was kept at 10 with a 2M sodium hydroxide solution. After the reaction was ended, the pH was lowered to pH 5.0 with hydrochloric acid. Subsequently, the final product was precipitated in 1500 ml ethanol (96%-solution). The precipitate was washed with acetone, and filtered again, and dried at room temperature during the night. The degree of oxidation (amount of aldehydes) of the C6-aldehyde starch was checked with a hydroxylamine titration and was analysed to be 21%. A similar approach was used to prepare C6-aldehyde starch granules containing 8.0% aldehyde groups, without the use of gelatinised starch[b)].

Example 2

With a dough mixer, four premixes were made using native potato starch (moisture content 14.6%), C6-aldehyde granular potato starch (moisture content 16.1%; degree of oxidation (aldehydes) 8.0% (preparation described in example 1)), demineralised water, and glycerol. Tables 3 gives an overview of the premixes used, and show the ratios of air-dry starch, air-dry C6-aldehyde starch, water (corrected for water present in starch and C6-aldehyde starch) and glycerol used.

These premixes were processed on a twin-screw co-rotating extruder (L/D=25) at 200 rpm using a temperature profile of 70° C. (hopper), x° C. (zone1), x° C. (zone2), x° C. (zone3), and 80° C. (die), in which x=115, 105, 95, and 85° C., respectively. The product throughput in the extruder was 3.6 kg/h. The materials processed were analysed with polarized optical microscopy (POM), to determine the degree of gelatinisation.

TABLE 3

Composition of premixes examined

| Premix | Composition premix | Parts starch | Parts C6-aldehyde | Parts water | Parts glycerol |
|---|---|---|---|---|---|
| 1 | starch only | 100 | 0 | 45 | 40 |
| 2 | Starch/C6-aldehyde (90:10) | 90 | 10 | 45 | 40 |
| 3 | Starch/C6-aldehyde (80:20) | 80 | 20 | 45 | 40 |
| 4 | Starch/C6-aldehyde (60:40) | 60 | 40 | 45 | 40 |

The results are summarized in Table 4, using the following ranking:

TABLE 4

The degree of gelatinisation as function of temperature and concentration C6-aldehyde starch added

| Premix | Composition premix | Temp. processed (max) (° C.) | Ranking gelatinisation |
|---|---|---|---|
| 1 | Starch only | 115 | 10 |
| 1 | Starch only | 105 | 8 |
| 1 | Starch only | 95 | 6 |
| 1 | Starch only | 85 | 6 |
| 4 | Starch/C6-aldehyde (60:40) | 115 | 10 |
| 4 | Starch/C6-aldehyde (60:40) | 105 | 10 |
| 4 | Starch/C6-aldehyde (60:40) | 95 | 9 |
| 4 | Starch/C6-aldehyde (60:40) | 85 | 6 |
| 3 | Starch/C6-aldehyde (80:20) | 115 | 10 |
| 3 | Starch/C6-aldehyde (80:20) | 105 | 10 |
| 3 | Starch/C6-aldehyde (80:20) | 95 | 8 |
| 3 | Starch/C6-aldehyde (80:20) | 85 | 6 |
| 2 | Starch/C6aldehyde (90:10) | 115 | 10 |
| 2 | Starch/C6aldehyde (90:10) | 105 | 9 |
| 2 | Starch/C6aldehyde (90:10) | 95 | 8 |
| 2 | Starch/C6aldehyde (90:10) | 85 | 6 |

Completely gelatinised: 10
Completely gelatinised/good gelatinised, but some crystallinity present: 9
Good gelatinised but some granules/crystallinity present: 8
Partially gelatinised but also many granules/crystallinity: 6

These results clearly illustrate that when C6-aldehyde starch was added to the premix, starch could be completely gelatinised at a lower processing temperature.

The invention claimed is:

1. A process for gelatinising starch and/or a starch derivative by subjecting starch and/or a starch derivative in the presence of a carbohydrate polymer to a thermo mechanical treatment, which carbohydrate polymer comprises aldehyde containing monomer units, whereby at least 1% of the aldehyde containing monomer units have one aldehyde group per monomer unit which aldehyde group is derived from a primary alcohol group at the C-6 position.

2. A process according to claim 1, wherein 1-50% of the aldehyde containing monomer units have one or more aldehyde group per monomer unit.

3. A process according to claim 2, wherein 1-20% of the aldehyde containing monomer units comprise one aldehyde group per monomer unit.

4. A process according to claim 1, wherein the carbohydrate polymer is selected from the group consisting of α-1,4-glucans, β-1,4-glucans, glucomannans, galactomannans, arabinoxylans, xylans, β-2,1-fructans and β-2,6-fructans.

5. A process according to claim 4, wherein the carbohydrate polymer comprises starch, cellulose, fructans, hemicellulose, and/or galactomannans.

6. A process according to claim 1, wherein the thermo mechanical treatment is carried out at a temperature in the range of from 80-130° C.

7. A process according to claim 1, wherein the thermo mechanical treatment is carried out continuously.

8. A process according to claim 1, wherein the thermo mechanical treatment is an extrusion.

9. A process for gelatinising starch and/or a starch derivative by subjecting starch and/or a starch derivative in the presence of a carbohydrate polymer to a thermo mechanical treatment, which carbohydrate polymer comprises aldehyde containing monomer units, whereby at least 1% of the aldehyde containing monomer units have one aldehyde group per monomer unit which aldehyde group is derived from a primary alcohol group and is introduced in the monomer unit by means of protected aldehydes (acetals) or substituted unsaturated functionalities followed by oxidation of through hindered nitroxyl mediated oxidation.

* * * * *

UNITED STATES PATENT AND TRADEMARK OFFICE
CERTIFICATE OF CORRECTION

PATENT NO. : 7,780,792 B2
APPLICATION NO. : 10/594121
DATED : August 24, 2010
INVENTOR(S) : Thornton et al.

Page 1 of 1

It is certified that error appears in the above-identified patent and that said Letters Patent is hereby corrected as shown below:

Title Page, Item (75) Inventors, should read: Jeffrey Wilson Thornton, Huizen (NL); Theodoor Maximiliaan Slaghek, Rotterdam (NL); Johannes Wilhelmus Timmermans, Ede (NL); Jan Matthijs Jetten, Zeist (NL); Harm Jan Thiewes, Woudenberg (NL)

Title Page, Item (73) Assignee, should read: Nederlandse Organisatie Voor Toegepast-Natuurwetenschappelijk Onderzoek TNO, Delft (NL)

Signed and Sealed this
Twenty-second Day of November, 2011

David J. Kappos
*Director of the United States Patent and Trademark Office*